US009629046B2

(12) United States Patent
Hapsari et al.

(10) Patent No.: US 9,629,046 B2
(45) Date of Patent: Apr. 18, 2017

(54) MOBILE COMMUNICATION SYSTEM (71) Applicant: NTT DOCOMO, INC., Tokyo (JP)

(72) Inventors: Wuri Andarmawanti Hapsari, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/890,169

(22) PCT Filed: May 8, 2014

(86) PCT No.: PCT/JP2014/062345
§ 371 (c)(1),
(2) Date: Nov. 10, 2015

(87) PCT Pub. No.: WO2014/181821
PCT Pub. Date: Nov. 13, 2014

(65) Prior Publication Data
US 2016/0073310 A1 Mar. 10, 2016

(30) Foreign Application Priority Data

May 10, 2013 (JP) ................................ 2013-100549

(51) Int. Cl.
*H04W 36/00* (2009.01)
*H04W 36/08* (2009.01)
(Continued)

(52) U.S. Cl.
CPC ........... *H04W 36/08* (2013.01); *H04W 12/04* (2013.01); *H04W 36/00* (2013.01);
(Continued)

(58) Field of Classification Search
CPC ..... H04W 36/08; H04W 36/00; H04W 36/18; H04W 36/0061; H04W 36/38;
(Continued)

(56) References Cited

U.S. PATENT DOCUMENTS 9,078,261 B2 * 7/2015 Takahashi ............. H04W 48/10
2012/0040676 A1 * 2/2012 Jang ...................... H04W 36/30
455/436
(Continued)

FOREIGN PATENT DOCUMENTS

WO 2012/107986 A1 8/2012

OTHER PUBLICATIONS

International Search Report issued in corresponding application No. PCT/JP2014/062345 mailed Aug. 12, 2014 (1 page).
(Continued)

*Primary Examiner* — Khai M Nguyen
(74) *Attorney, Agent, or Firm* — Osha Liang LLP (57) ABSTRACT A system and method to appropriately perform a connection reestablishment procedure in a network adapted to an MFBI function is disclosed. In a mobile communication system, a radio base station (eNB#A) is configured, when the radio base station (eNB#A) determines that a mobile station (UE) is adapted to the MFBI function, to select a band out of bands which are supported by a cell under a radio base station (eNB#B), the band having the highest priority to be selected by the mobile station (UE) in an "RRC_IDLE state", and to send the radio base station (eNB#B) "HO Preparation" including KeNB* created by using "DL EAR-FCN" of the selected band.

7 Claims, 5 Drawing Sheets (51) Int. Cl.
  *H04W 12/04* (2009.01)
  *H04W 76/02* (2009.01)
  *H04W 8/24* (2009.01)
  *H04W 36/18* (2009.01)
  *H04W 36/38* (2009.01)

(52) U.S. Cl.
  CPC ..... *H04W 36/0055* (2013.01); *H04W 76/027* (2013.01); *H04W 8/24* (2013.01); *H04W 36/0038* (2013.01); *H04W 36/0061* (2013.01); *H04W 36/18* (2013.01); *H04W 36/38* (2013.01)

(58) Field of Classification Search
  CPC ..... H04W 12/04; H04W 8/24; H04W 76/027; H04W 36/0055; H04W 36/0038
  USPC ................................. 455/437, 438, 439, 436
  See application file for complete search history.

(56) References Cited

U.S. PATENT DOCUMENTS

2012/0196603 A1* 8/2012 Mochizuki ............ H04W 48/02 455/436
2013/0078989 A1* 3/2013 Kubota ................. H04W 48/12 455/422.1
2014/0302821 A1* 10/2014 Hwang ............. H04W 36/0055 455/411
2015/0271722 A1* 9/2015 Koskela ............ H04W 72/0453 455/436

OTHER PUBLICATIONS

Written Opinion issued in corresponding application No. PCT/JP2014/062345 mailed Aug. 12, 2014 (3 pages).
Nokia Siemens Networks; "Security key generation in case of MFBI"; 3GPP TSG-RAN WG2 Meeting #81bis, R2-131148, Chicago, USA, Apr. 15-19, 2013 (2 pages).
Samsung, et al; "MFBI details (LTE focus)"; 3GPP TSG RAN WG2 Meeting #80, R2-125335, New Orleans, USA, Nov. 12-16, 2012 (6 pages).
3GPP TS 36.331 V11.3.0; 3rd Generation Partnership Project; Technical Specification Group Radio Access Network; Evolved Universal Terrestrial Radio Access (E-UTRA); Radio Resource Control (RRC); Protocol specification (Release 11); Mar. 2013 (344 pages).

* cited by examiner

MOBILE COMMUNICATION SYSTEM

TECHNICAL FIELD

The present invention relates to a mobile communication system.

BACKGROUND ART

LTE (Long Term Evolution) Release-11 has defined an MFBI (Multiple Frequency Band Indicator) function.

Figure 6:
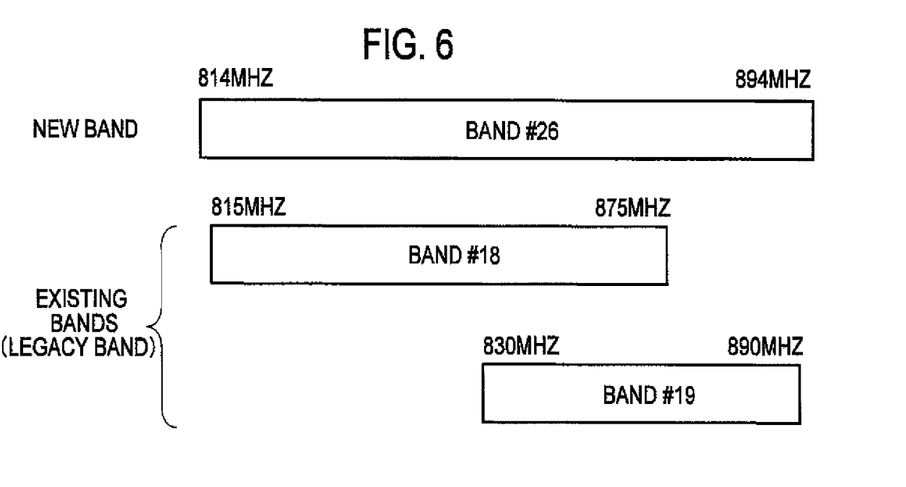
FIG. 6 is a diagram for explaining a conventional MFBI function.

Here, the MFBI function is a function applicable to a case shown in FIG. 6 where each of existing bands (legacy bands) supported by a subject cell and a new band (a newly defined band) overlap each other. This function notifies of the existing bands and the new band by using SIB 1 (System Information Block 1) on the subject cell.

Figure 7:
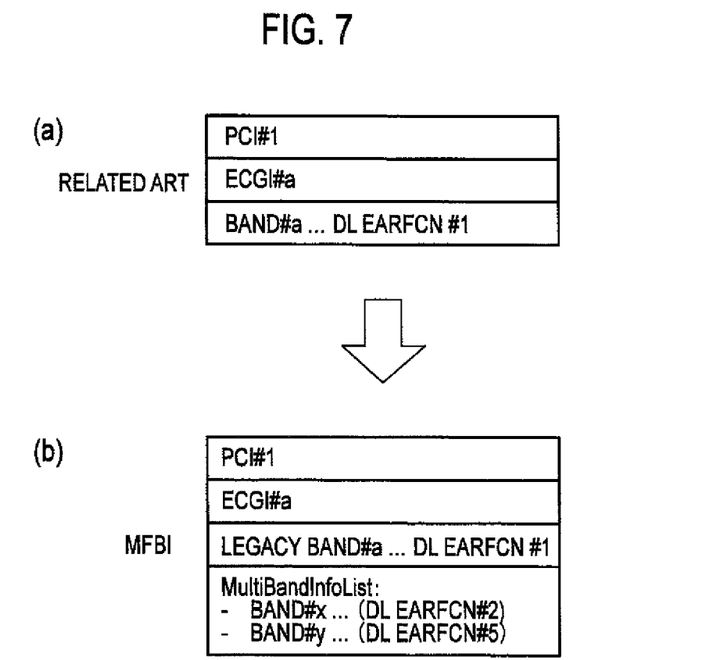
FIG. 7 is a diagram for explaining the conventional MFBI function.

As shown in FIG. 7(a), a conventional radio base station eNB is configured to use the SIB 1 on a cell under the radio base station eNB to notify of an existing band supported by the cell (and "DL EARFCN (Downlink E-UTRAN Absolute Radio Frequency Channel Number)" of the existing band).

In contrast, as shown in FIG. 7(b), a radio base station eNB adapted to the MFBI function is configured to use an information element "FreqBandIndicator" in the SIB 1 on a cell under the radio base station eNB to notify of an existing band supported by the cell (and "DL EARFCN" of the existing band), and to use an information element "MultiBandInfoList" in the SIB 1 on the cell to notify of a new band supported by the cell (and "DL EARFCN" of the new band).

Meanwhile, a mobile station UE adapted to the MFBI function is configured to select an existing band notified from the SIB 1 on each cell when the mobile station UE is adapted to the existing band.

On the other hand, the mobile station UE adapted to the MFBI function is configured, when the mobile station UE is not adapted to the existing band notified from the SIB 1 on each cell, to select a new band ranked at the highest level in the "MultiBandInfoList" out of new bands to which the mobile station UE is adapted.

PRIOR ART DOCUMENT

Non-Patent Document

Non-patent document 1: 3GPP TS36.331

SUMMARY OF THE INVENTION

Meanwhile, in the existing LTE method, assuming a case where a handover ends in failure, a handover source radio base station S-eNB is configured to create KeNB* of a cell under a handover target radio base station T-eNB (a handover target cell), and to notify the handover target radio base station T-eNB of the KeNB* by using "HO Preparation (Reestablishment Info)" in order to enable "AS recovery".

Here, the handover source radio base station S-eNB is configured to create the KeNB* based on an active KeNB key (or NH (Next Hop parameter)), PCI (Physical Cell Identity) of the handover target cell, and "DL EARFCN" of the handover target cell.

However, in a network adapted to the MFBI function, there are multiple bands supported by the handover target cell.

For this reason, there is a problem that the handover source radio base station S-eNB is incapable of determining which "DL EARFCN" of a certain band out of "DL EARFCN" of the multiple bands supported by the handover target cell should be used to create the KeNB*.

The present invention has been made in view of the aforementioned problem. An objective of the present invention is to provide a mobile communication system which is capable of appropriately performing a connection reestablishment procedure in a network adapted to an MFBI function.

A first feature of the present invention is summarized as a mobile communication system configured to enable a mobile station in a state connected to a cell under a first radio base station adapted to a multiple frequency band indicator function to reestablish connection to a cell under a second radio base station adapted to the multiple frequency band indicator function, in which the first radio base station is configured, when the first radio base station determines that the mobile station is adapted to the multiple frequency band indicator function, to select a certain band out of bands which are supported by the cell under the second radio base station, the certain band having the highest priority to be selected by the mobile station in an idle state, and to send the second radio base station a handover preparation signal including a radio base station key, the signal being created by using identification information on a downlink center frequency of the selected band, and the multiple frequency band indicator function is a function applicable to a case where an existing band supported by a subject cell and a new band overlap each other, and configured to notify of the existing band and the new band by using broadcast information on the subject cell. A second feature of the present invention is summarized as a mobile communication system configured to enable a mobile station in a state connected to a cell under a first radio base station adapted to a multiple frequency band indicator function to reestablish connection to a cell under a second radio base station adapted to the multiple frequency band indicator function, in which the first radio base station is configured, when the first radio base station determines that the mobile station is adapted to the multiple frequency band indicator function, to send the second radio base station a handover preparation signal including a radio base station key, the signal being created by using identification information on downlink center frequency of every band supported by the cell under the second radio base station, and the multiple frequency band indicator function is a function applicable to a case where an existing band supported by a subject cell and a new band overlap each other, and configured to notify of the existing band and the new band by using broadcast information on the subject cell.

MODE FOR CARRYING OUT THE INVENTION

A mobile communication system according to an embodiment of the present invention will be described with reference to FIG. 1 to FIG. 4.

Figure 1:
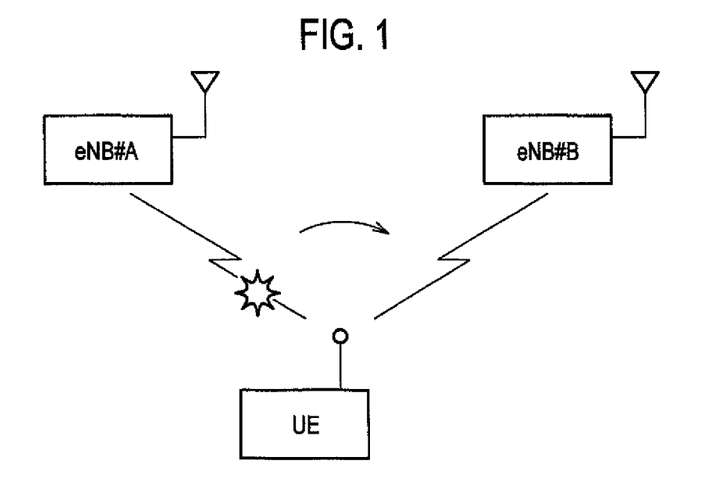
FIG. 1 is a diagram for explaining an overall configuration of a mobile communication system according to an embodiment of the present invention.

As shown in FIG. 1, a mobile communication system of this embodiment includes a radio base station eNB#A and a radio base station eNB#B. Here, the radio base station eNB#A and the radio base station eNB#B are assumed to be adapted to an MFBI function.

Moreover, this embodiment will be described on the assumption that a mobile station UE in a state connected to a cell under the radio base station eNB#A is going to reestablish connection to a cell under the radio base station eNB#B.

Figure 2:
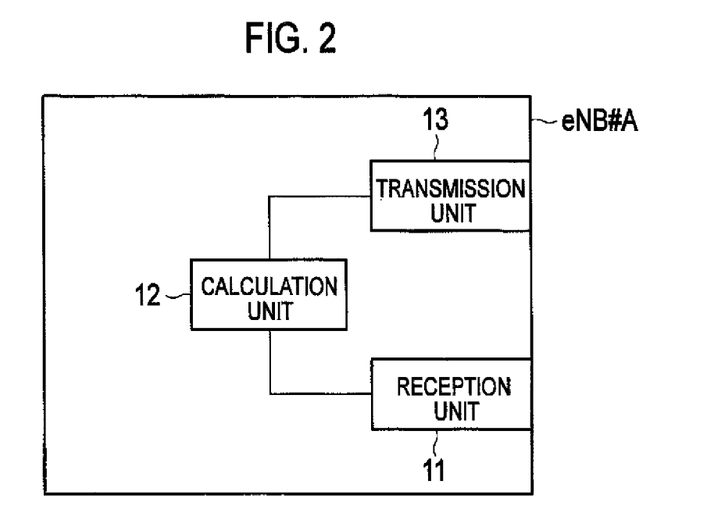
FIG. 2 is a functional block diagram of a radio base station eNB#A according to the embodiment of the present invention.

As shown in FIG. 2, the radio base station eNB#A of this embodiment includes a reception unit 11, a calculation unit 12, and a transmission unit 13.

The reception unit 11 is configured to receive various signals from the mobile station UE and the radio base station eNB#B. The calculation unit 12 is configured to calculate KeNB* when the above-mentioned handover takes place. The transmission unit 13 is configured to transmit various signals to the mobile station UE and the radio base station eNB#B.

Specifically, the calculation unit 12 is configured, when it determines that the mobile station UE is adapted to the MFBI function, to select a band out of bands which are supported by a cell or each of cells (one or more handover target candidate cells) under the radio base station eNB#B, the band having the highest priority to be selected by the mobile station UE in an "RRC_IDLE state".

Here, the calculation unit 12 is configured, when the mobile station UE is adapted to an existing band included in the bands supported by any of the cells under the radio base station eNB#B, to select the existing band as the above-mentioned band having the highest priority.

On the other hand, the calculation unit 12 is configured, when the mobile station UE is not adapted to the existing band included in the bands supported by any of the cells under the radio base station eNB#B, to select a new band ranked at the highest level in "MultiBandInfoList" out of new bands to which the mobile station UE is adapted, as the above-mentioned band having the highest priority.

Then, the calculation unit 12 is configured to create KeNB* based on active KeNB (or NH), PCI of the cell under the radio base station eNB#B (a handover target cell), and "DL EARFCN" of the band selected as described above.

Here, the calculation unit 12 may be configured to determine whether or not the mobile station UN is adapted to the MFBI function, on the basis of "UE Capability (E-UTRA Capability)" received from the mobile station UE by the reception unit 11.

Specifically, the calculation unit 12 may be configured to determine whether or not the mobile station UE is adapted to the MFBI function, on the basis of an information element "SupportedBandListE-UTRA" in the above-mentioned "UE Capability (E-UTRA Capability)".

Meanwhile, the calculation unit 12 may be configured to perform determination regarding the band to which the mobile station UE is adapted, on the basis of the above-mentioned "UE Capability (E-UTRA Capability)".

The transmission unit 13 is configured to send the radio base station eNB#B "HO Preparation (Reestablishment Info)" including the KeNB* calculated by the calculation unit 12.

An operation of the mobile communication system of this embodiment will be described below with reference to FIG. 3 and FIG. 4. Specifically, a description will be given of an operation to be performed when the mobile station UE connected to the cell under the radio base station eNB#A reestablishes connection to the cell under the radio base station eNB#B in the mobile communication system of this embodiment.

Figure 3:
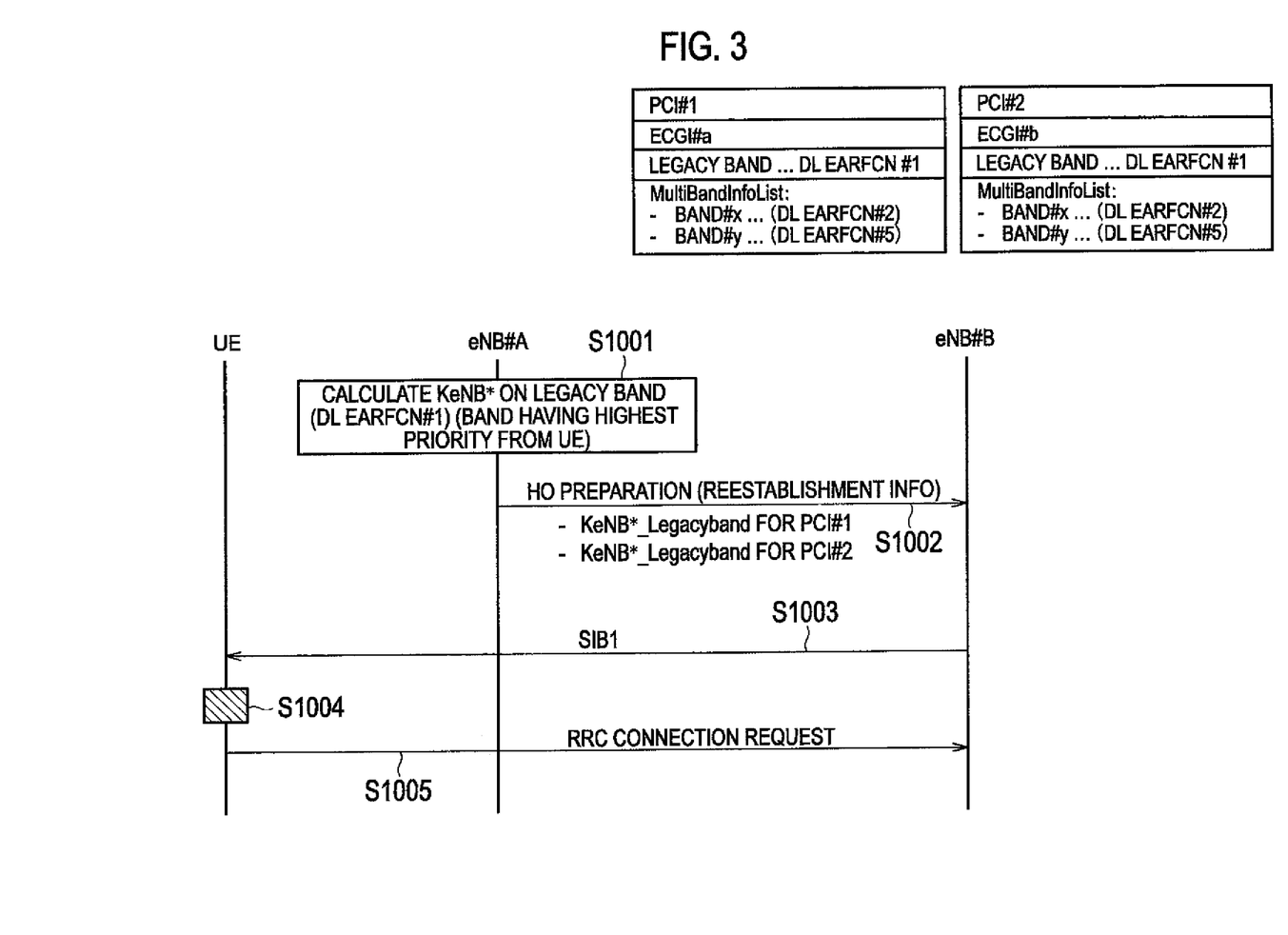
FIG. 3 is a sequence diagram for explaining an operation of the mobile communication system according to the embodiment of the present invention.
Figure 4:
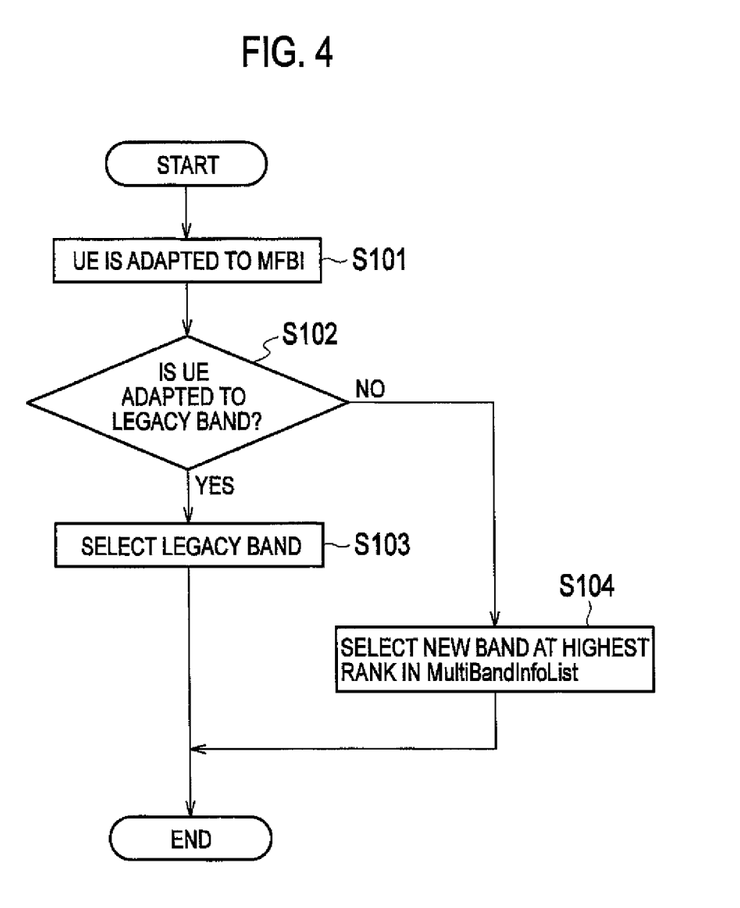
FIG. 4 is a flowchart for explaining an operation of the radio base station eNB#A according to the embodiment of the present invention.

As shown in FIG. 3, in step S1001, the radio base station eNB#A selects the band having the highest priority to be selected by the mobile station UE in an "RRC_IDLE state" out of the bands which are supported by cells (such as a cell of PCI#1 and a cell of PCI#2) under the radio base station eNB#B, respectively, in accordance with a procedure shown in FIG. 4 (i.e., the same procedure as a band selection algorithm by the mobile station UE), and then creates the KeNB* by using the "DL EARFCN" of the selected band. In step S1002, the radio base station eNB#A sends the radio base station eNB#B the "HO Preparation (Reestablishment Info)" including the KeNB*.

In step S1003, the radio base station eNB#B uses the SIB 1 to notify each of the cells (such as the cell of the PCI#1 and the cell of the PCI#2) under the radio base station eNB#B, of the bands supported by the respective cells (or the "DL EARFCN" of the bands) including an "existing band (DL EARFCN#1)" as well as a "Band#x (DL EARFCN#2)" and a "Band#x (DL EARFCN#5)" as new bands, for example.

In step S1004, the mobile station UE selects the existing band when the mobile station UE is adapted to the existing band notified by using the SIB 1. When the mobile station UE is not adapted to the existing band notified by using the SIB 1, the mobile station UE selects the new band ranked at the highest level in the "MultiBandInfoList" out of the new bands to which the mobile station UE is adapted.

In step S1005, the mobile station UE establishes RRC connection between the mobile station US and the radio base station eNB#B by using the selected band.

Here, with reference to FIG. 4, a description will be given of an operation in which the radio base station eNB#A selects the band having the highest priority to be selected by the mobile station UE in the "RRC_IDLE state" in the mobile communication system of this embodiment.

As shown in FIG. 4, when the radio base station eNB#A determines in step S101 that the mobile station UE is adapted to the MFBI function, the radio base station eNB#A determines whether or not the mobile station US is adapted to the existing band included in the bands supported by the cells under the radio base station eNB#B in step S102.

In the case of "Yes", in step S103, the radio base station eNB#A selects the existing band as the above-described band having the highest priority to be selected by the mobile station UE in the "RRC_IDLE state".

On the other hand, in the case of "No", the radio base station eNB#A selects the new band ranked at the highest level in the "MultiBandInfoList" out of the new bands to which the mobile station UE is adapted in step S104, as the above-described band having the highest priority to be selected by the mobile station UE in the "RRC_IDLE state".

First Modified Example

A mobile communication system according to a first modified example of the present invention will be described below with reference to FIG. 5, while focusing on different features from those of the mobile communication system according to the above-described embodiment.

In the mobile communication system according to the first modified example of the present invention, the calculation unit 12 of the radio base station eNB#A is configured, when it determines that the mobile station UE is adapted to the MFBI function, to create one or more KeNB* by using the "DL EARFCN" of all the bands supported by the cells under the radio base station eNB#B.

The transmission unit 13 sends the radio base station eNB#B the "HO Preparation" including all the KeNB* created by the calculation unit 12.

An operation of the mobile communication system of the first modified example will be described below with reference to FIG. 5. Specifically, a description will be given of an operation to be performed when the mobile station UE connected to the cell under the radio base station eNB#A reestablishes connection to the cell under the radio base station eNB#B in the mobile communication system of the first modified example.

Figure 5:
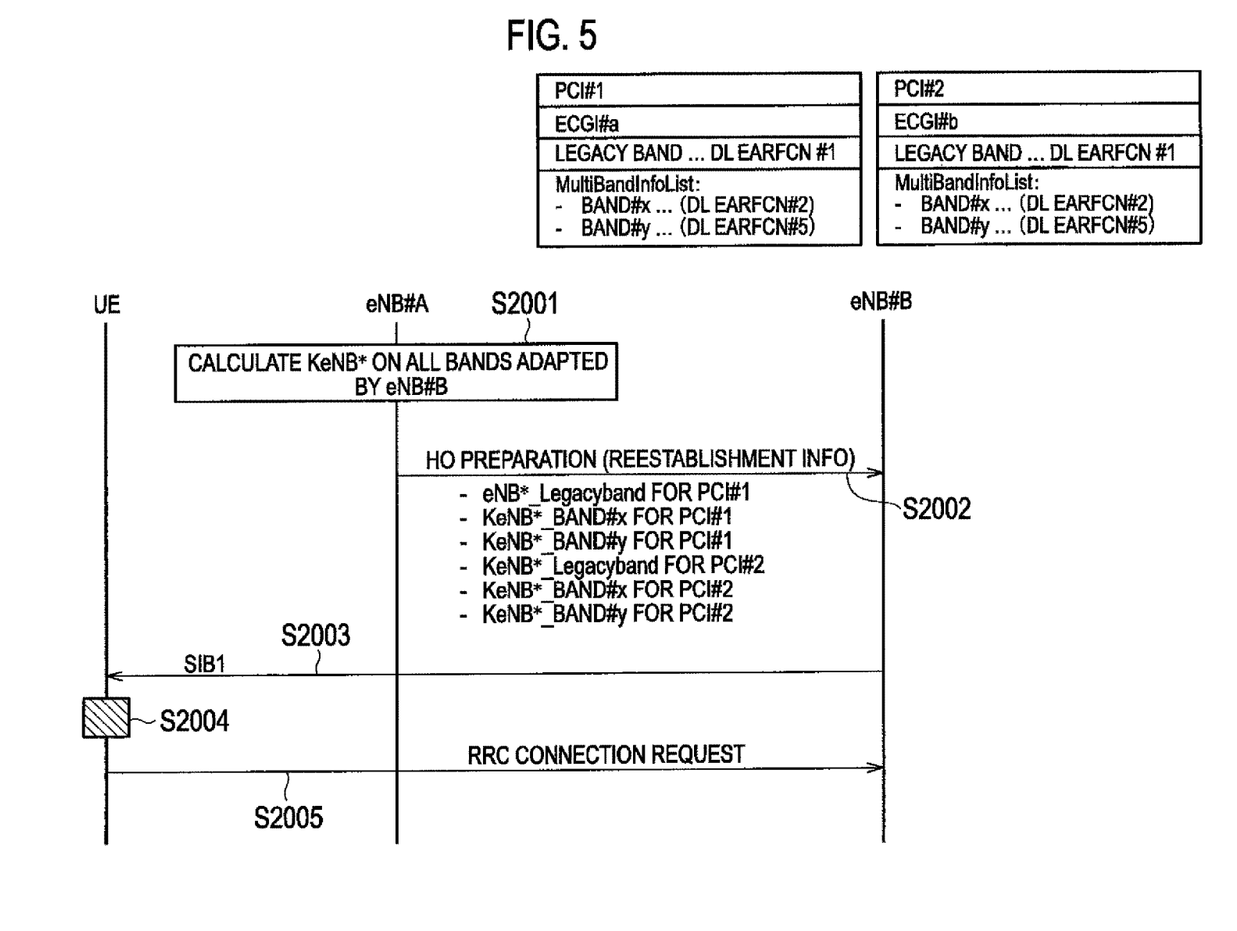
FIG. 5 is a sequence diagram for explaining an operation of a mobile communication system according to a first modified example the present invention.

As shown in FIG. 5, in step S2001, the radio base station eNB#A creates the KeNB* by using the "DL EARFCN" (such as "DL EARFCN#1"/"DL EARFCN#2"/"DL EARFCN#4") of all the bands (such as the existing band (the legacy band)/a Band#x (a new band)/a Band#y (a new band)) supported by the respective cells (such as the cell of the PCI#1 and the cell of the PCI#2) under the radio base station eNB#B.

In step S2002, the radio base station eNB#A sends the radio base station eNB#B the "HO Preparation (Reestablishment Info)" including all the KeNB* thus created.

In step S2003, the radio base station eNB#B uses the SIB 1 to notify each of the cells (such as the cell of the PCI#1 and the cell of the PCI#2) under the radio base station eNB#B, of the bands supported by the respective cells (or the "DL EARFCN" of the bands) including the "existing band (DL EARFCN#1)" as well as the "Band#x (DL EARFCN#2)" and the "Band#x (DL EARFCN#5)" as the new bands, for example.

In step S2004, the mobile station. UE selects the existing band when the mobile station GE is adapted to the existing band notified by using the SIB 1. When the mobile station UE is not adapted to the existing band notified by using the SIB 1, the mobile station UE selects the new band ranked at the highest level in the "MultiBandInfoList" out of the new bands to which the mobile station GE is adapted.

In step S2005, the mobile station UE establishes the RRC connection between the mobile station GE and the radio base station eNB#B by using the selected band.

The features of the present embodiment may also be expressed as follows.

A first feature of the present embodiment is summarized as a mobile communication system configured to enable a mobile station UE in a state connected to a cell under a radio base station eNB#A (first radio base station) adapted to an MFBI function (multiple frequency band indicator function) to reestablish connection to a cell under a radio base station eNB#B (second radio base station) adapted to the MFBI function, in which the radio base station eNB#A is config- ured, when the radio base station eNB#A determines that the mobile station UE is adapted to the MFBI function, to select a certain band out of bands which are supported by the cell under the radio base station eNB#B, the certain band having the highest priority to be selected by the mobile station UE in an "RRC_IDLE state (idle state)", and to send the radio base station eNB#B an "HO Preparation (handover preparation signal)" including a KeNB* (radio base station key), the signal being created by using "DL EARFCN (identification information on a downlink center frequency)" of the selected band, and the MFBI function is a function applicable to a case where an existing band supported by a subject cell and a new band overlap each other, and configured to notify of the existing band and the new band by using SIB 1 (broadcast information) on the subject cell.

According to the above-described feature, the radio base station eNB#A selects the band out of the bands which are supported by the cell under the radio base station eNB#B, the band having the highest priority to be selected by the mobile station UE in the "RRC_IDLE state", then creates the KeNB* by using the "DL EARFCN" of the band, and notifies the radio base station eNB#B of the KeNB*. Thus, it is possible to appropriately reestablish connection in a network adapted to the MFBI function.

In the first feature of the present embodiment, the radio base station eNB#A may be configured to determine whether or not the mobile station UE is adapted to the MFBI function, based on "UE Capability (capability information)" acquired from the mobile station UE.

According to the above-described feature, the radio base station eNB#A can determine whether or not the mobile station UE is adapted to the MFBI function, by using an existing signal.

In the first feature of the present embodiment, the SIB 1 may include a "MultiBandInfoList (list)" notifying of the new band, the radio base station eNB#A may be configured, when the mobile station UE is adapted to the existing band included in the band supported by the cell under the radio base station eNB#B, to select the existing band as the band having the highest priority, and the radio base station eNB#A may be configured, when the mobile station UE is not adapted to the existing band included in the band supported by the cell under the radio base station eNB#B, to select a new band ranked at the highest level in the "MultiBandInfoList" out of new bands to which the mobile station UE is adapted, as the band having the highest priority.

According to the above-described feature, it is possible to appropriately reestablish connection in the network adapted to the MFBI function while using an existing band selection algorithm by the mobile station UE.

A second feature of the present embodiment is summarized as a mobile communication system configured to enable a mobile station UE in a state connected to a cell under a radio base station eNB#A adapted to an MFBI function to reestablish connection to a cell under a radio base station eNB#B adapted to the MFBI function, in which the radio base station eNB#A is configured, when the radio base station eNB#A determines that the mobile station UE is adapted to the MFBI function, to send the radio base station eNB#B an "HO Preparation" including a KeNB*, the signal being created by using "DL EARFCN" of every band supported by the cell under the radio base station eNB#B, and the MFBI function is a function applicable to a case where an existing band supported by a subject cell and a new band overlap each other, and configured to notify of the existing band and the new band by using SIB 1 on the subject cell.

According to the above-described feature, the radio base station eNB#A creates the KeNB* by using the "DL EAR-FCN" of all the bands supported by the cell under the radio base station eNB#B, and notifies the radio base station eNB#B of the KeNB*. Thus, it is possible to appropriately reestablish connection even when the band supported by the radio base station eNB#A is different from the band supported by the radio base station eNB#B in the network adapted to the MFBI function.

It should be noted that the foregoing operations of the mobile station UE, the radio base stations eNB#A/eNB#B may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE, the radio base station eNB#A/eNB#B. Otherwise, the storage medium and the processor may be provided as discrete components inside the mobile station UE, the radio base station eNB#A/eNB#B. Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-100549 (filed on May 10, 2013) is incorporated by reference in the present specification.

INDUSTRIAL APPLICABILITY

As described above, according to the present invention, it is possible to provide a mobile communication system which is capable of appropriately performing a connection reestablishment procedure in a network adapted to an MFBI function.

EXPLANATION OF THE REFERENCE NUMERALS eNB#A/eNB#B radio base station
UE mobile station
11 reception unit
12 calculation unit
13 transmission unit

The invention claimed is:

1. A mobile communication system configured to enable a mobile station in a state connected to a cell under a first radio base station adapted to a multiple frequency band indicator function to reestablish connection to a cell under a second radio base station adapted to the multiple frequency band indicator function, wherein the first radio base station is configured, when the first radio base station determines that the mobile station is adapted to the multiple frequency band indicator function, to select a certain band out of bands which are supported by the cell under the second radio base station, the certain band having the highest priority to be selected by the mobile station in an idle state, and to send the second radio base station a handover preparation signal including a radio base station key, the signal being created by using identification information on a downlink center frequency of the selected band, and the multiple frequency band indicator function is a function applicable to a case where an existing band supported by a subject cell and a new band overlap each other, and to notify of the existing band and the new band by using broadcast information on the subject cell.

2. The mobile communication system according to claim 1, wherein the first radio base station is configured to determine whether or not the mobile station is adapted to the multiple frequency band indicator function, based on capability information acquired from the mobile station.

3. The mobile communication system according to claim 2, wherein the broadcast information includes a list notifying of the new band, the first radio base station is configured, when the mobile station is adapted to the existing band included in the band supported by the cell under the second radio base station, select the existing band as the band having the highest priority, and the first radio base station is configured, when the mobile station is not adapted to the existing band included in the band supported by the cell under the second radio base station, to select a new band ranked at the highest level in the list out of new bands to which the mobile station is adapted, as the band having the highest priority.

4. The mobile communication system according to claim 1, wherein the broadcast information includes a list notifying of the new band, the first radio base station is configured, when the mobile station is adapted to the existing band included in the band supported by the cell under the second radio base station, to select the existing band as the band having the highest priority, and the first radio base station is configured, when the mobile station is not adapted to the existing band included in the band supported by the cell under the second radio base station, to select a new band ranked at the highest level in the list out of new bands to which the mobile station is adapted, as the band having the highest priority.

5. The mobile communication system according to claim 1, wherein the first radio base station determines whether the mobile station UE is adapted to the multiple frequency band indicator function on the basis of an information element "SupportedBandListE-UTRA" in a "UE Capability (E-UTRA Capability)" received from the mobile station.

6. A mobile communication system configured to enable a mobile station in a state connected to a cell under a first radio base station adapted to a multiple frequency band indicator function to reestablish connection to a cell under a second radio base station adapted to the multiple frequency band indicator function, wherein the first radio base station is configured, when the first radio base station determines that the mobile station is adapted to the multiple frequency band indicator function, to send the second radio base station a handover preparation signal including a radio base station key, the signal being created by using identification information on downlink center frequency of every band supported by the cell under the second radio base station, and the multiple frequency band indicator function is a function applicable to a case where an existing band supported by a subject cell and a new band overlap each other, and configured to notify of the existing band and the new band by using broadcast information on the subject cell.

7. The mobile communication system according to claim 6, wherein the first radio base station determines whether the mobile station UE is adapted to the multiple frequency band indicator function on the basis of an information element "SupportedBandListE-UTRA" in a "UE Capability (E-UTRA Capability)" received from the mobile station.

* * * * *